United States Patent
Farley et al.

[11] Patent Number: 5,462,487
[45] Date of Patent: Oct. 31, 1995

[54] ROCK GUARD FOR A COMBINE

[76] Inventors: Scott A. Farley, 3386 110th St. Box 70, Jamaica, Iowa 50128; Errol L. Meinecke, 304 E. Harrison, Jefferson, Iowa 50129

[21] Appl. No.: 312,478

[22] Filed: Sep. 23, 1994

[51] Int. Cl.⁶ .................................................. A01D 75/18
[52] U.S. Cl. ........................... 460/105; 56/14.5; 56/158
[58] Field of Search ............................ 56/14.5, 14.6, 56/123, 158; 460/105, 113

[56] References Cited

U.S. PATENT DOCUMENTS

| | | |
|---|---|---|
| 285,422 | 9/1883 | Lockhart . |
| 1,806,928 | 5/1931 | Bartels ........................... 56/158 |
| 1,917,604 | 7/1933 | Scranton, Jr. ................. 56/158 X |
| 2,737,006 | 3/1956 | Klingler ........................ 56/158 |
| 3,412,535 | 11/1968 | Drummond .................. 56/14.5 X |
| 3,545,186 | 12/1970 | Glass . |
| 3,756,248 | 9/1973 | Mathews . |
| 3,813,859 | 6/1974 | Fuller et al. ................. 56/158 X |
| 3,866,400 | 2/1975 | May .............................. 56/158 |
| 4,253,472 | 3/1981 | Rayfield . |
| 4,729,212 | 3/1988 | Rabitsch ....................... 56/119 |
| 4,891,932 | 1/1990 | Johnson ........................ 56/158 |
| 5,174,101 | 12/1992 | Rabitsch ....................... 56/17.4 |

*Primary Examiner*—George A. Suchfield
*Attorney, Agent, or Firm*—Henderson & Sturm

[57] ABSTRACT

A rock guard for a crop harvesting combine header. The guard is attached to the grain table immediately behind the cutter bar and extends vertically upward from the grain table such that the upper edge is spaced below the resilient fingers of the reel when they move over the guard. Gaps formed in the guard register with the joints of the flexible grain table so that the guard will flex with the grain table. Brackets used to mount the guard to the grain table are secured by the exiting cutter bar bolts so that no special mounting holes are needed.

18 Claims, 2 Drawing Sheets

ROCK GUARD FOR A COMBINE

TECHNICAL FIELD

This invention relates to agricultural crop harvesting equipment, and more particularly to a device to prevent rocks from entering and damaging the harvesting equipment.

BACKGROUND ART

The bean head of a combine is positioned relatively close to ground level when in operation, and therefore, is prone to intake field debris such as rocks. Rocks that pass over the cutter bar onto the grain table can cause considerable structural damage to the feed auger of the bean head and to other components of the combine. This results in high maintenance costs and expensive downtime on a critical piece of harvesting equipment.

Known devices to prevent rock damage to combines include traps to prevent damage to the threshing cylinder and concave. These devices, however, deal with the problem of rock damages only after the rock has advanced to a certain point within the machine. Of course, considerable damage may be done by the rock before it reaches that point.

Known guards for preventing rocks from advancing beyond the cutter bar limit access to the bolts on the cutter bar making cutter bar maintenance difficult.

Those concerned with these and other problems recognize the need for an improved rock guard for a combine.

DISCLOSURE OF THE INVENTION

The present invention provides a rock guard for a crop harvesting combine header. The guard is attached to the grain table immediately behind the cutter bar and extends vertically upward from the grain table such that the upper edge is spaced below the resilient fingers of the reel when they move over the guard. Gaps formed in the guard register with the joints of the flexible grain table so that the guard will flex with the grain table. Brackets used to mount the guard to the grain table are secured by the exiting cutter bar bolts so that no special mounting holes are needed An object of the present invention is the provision of an improved rock guard for a combine.

Another object is to provide a rock guard for a combine that is easily installed on the grain table.

A further object of the invention is the provision of a rock guard for a combine that is inexpensive, durable, and easy to maintain.

Still another object is to provide a rock guard for a combine that flexes with the flexible grain table.

A still further object of the present invention is the provision of a rock guard for a combine that does not limit access needed for maintenance of the cutter bar.

Yet another object is to provide a rock guard for a combine that does not limit the vision of the operator, and allows the operator to eject rocks from the combine before they move onto the grain table.

BRIEF DESCRIPTION OF THE DRAWINGS

These and other attributes of the invention will become more clear upon a through study of the following description of the best mode for carrying out the invention, particularly when reviewed in conjunction with the drawings, wherein.

BEST MODE FOR CARRYING OUT THE INVENTION

Figure 1:
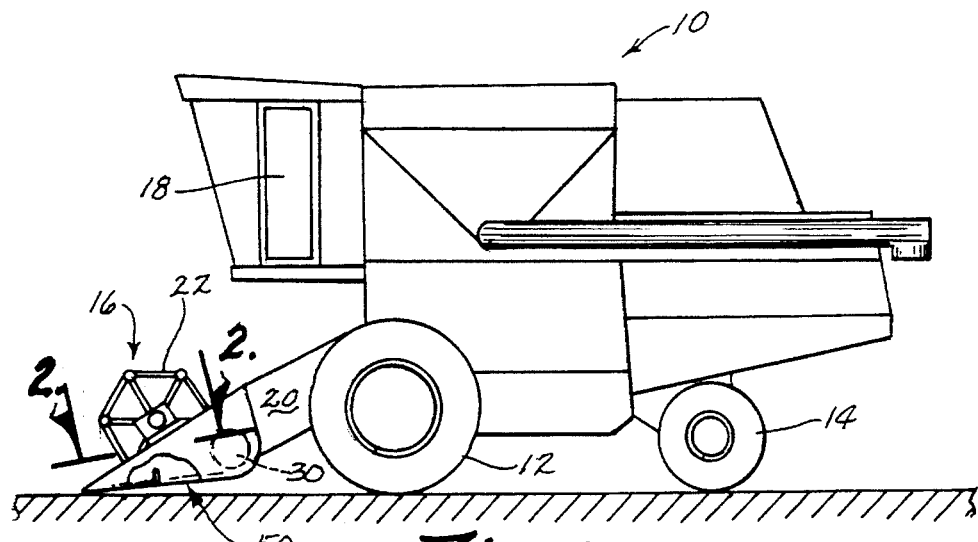
FIG. 1 is a side elevation view of a crop harvesting combine having a header adapted to harvest crops such as soy beans, wheat, or other small grains, and having a portion of the header cut away to show the location of the rock guard of the present invention.

Referring now the drawings, wherein like reference numerals designate identical or corresponding parts throughout the several views, FIG. 1 shows a combine (10) having a mobile frame supported by a pair of primary driving wheels (12) and a small pair of steerable wheels (14). The combine (10) carries a header (16) adapted to harvest crops such as soy beans, wheat, or other small grains. An operator's cab (18) is supported on the frame and extends forwardly over the infeed housing (20) so that the operator can have a clear view of the header (16).

Figure 2:
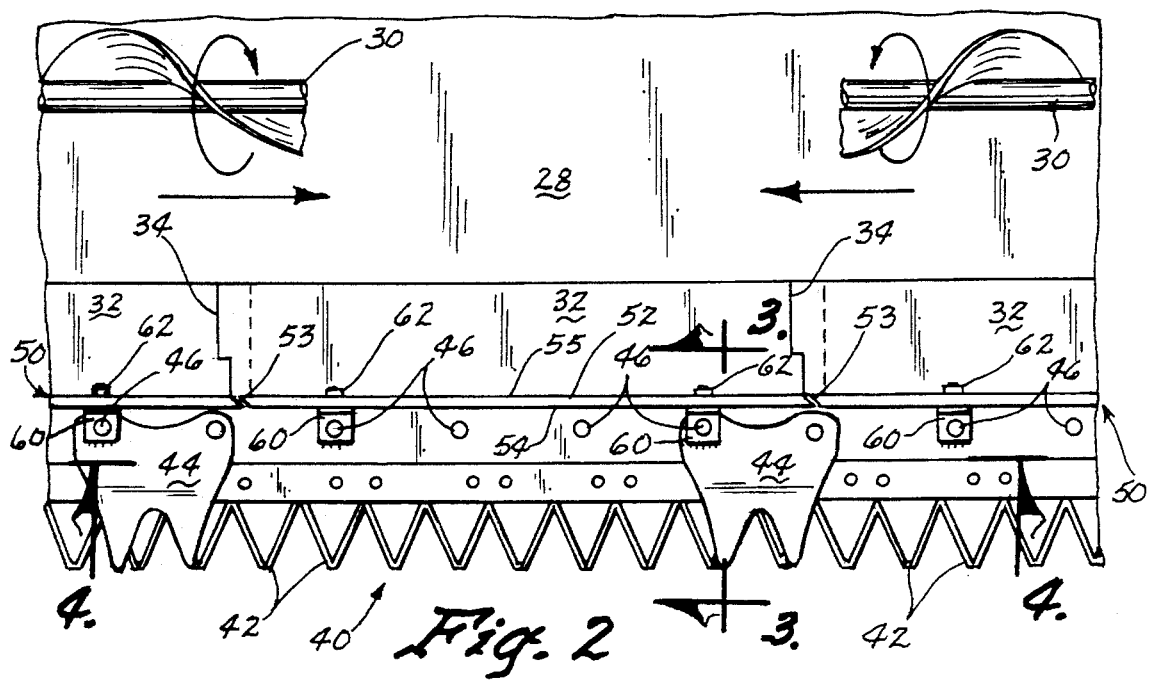
FIG. 2 is a top plan view taken along line 2—2 of FIG. 1 illustrating a portion of the combine header including the cutter bar, flexible grain table, and intake auger, and showing one embodiment of the rock guard of the present invention mounted on the grain table immediately behind the cutter bar.

As most clearly shown in FIGS. 1 and 2, the header (16) includes a rotating reel (22) having a number of extending resilient fingers (24) disposed to contact and move the crop back into the cutter bar (40) and onto the grain table (28). The crop then moves back to the infeed auger (30) and through the infeed housing (20) to be threshed. As shown in FIG. 2, the forward portion of the grain table (28) carries a number of overlapping sections (32) spaced at regular intervals to form flexible joints (34) which allow the grain table (28) to flex vertically as it moves over the field. The cutter bar (40) includes reciprocating blades (42) and clamps (44) secured to the grain table (28) by bolts (46).

Figure 3:
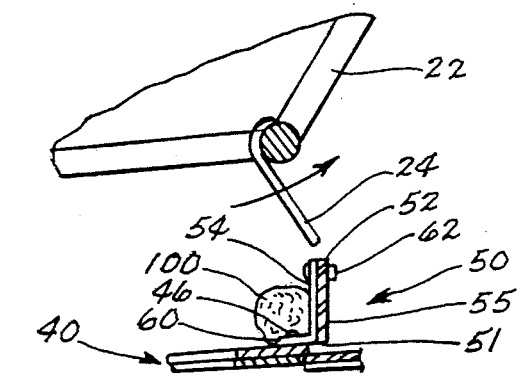
FIG. 3 is a partial side elevation sectional view taken along line 3—3 of FIG. 2 showing the spacing of the flexible fingers of the reel above the upper edge of the rock guard.
Figure 4:
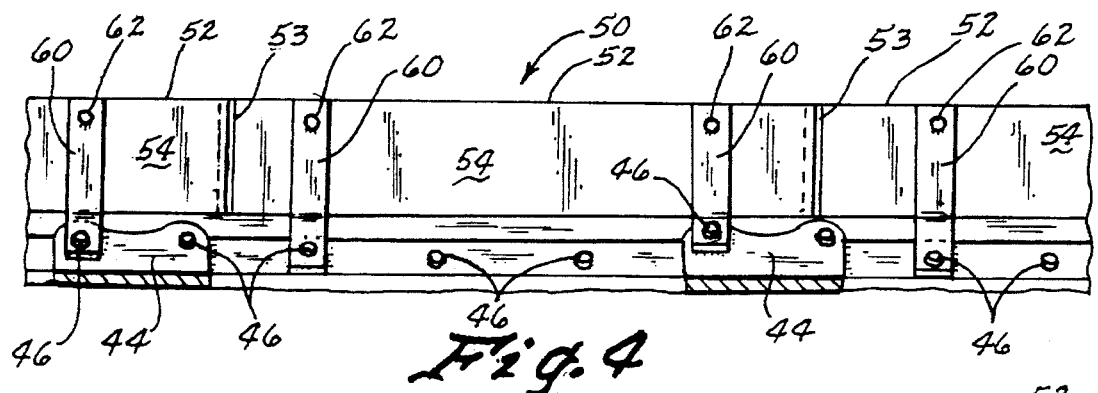
FIG. 4 is a front elevational sectional view taken along line 4—4 of FIG. 2 showing the vertically disposed rock guard mounted by brackets using the bolts used to mount the cutter bar.
Figure 5:
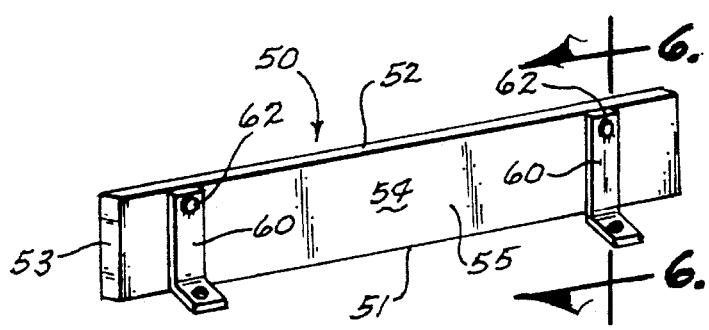
FIG. 5 is a perspective view showing one of the rock guard sections.
Figure 6:
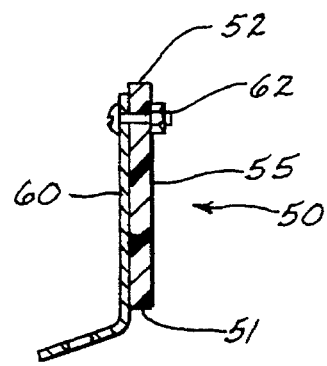
FIG. 6 is a side elevation sectional view taken along line 6—6 of FIG. 5.

Referring now to FIGS. 1–6, the rock guard (50) of the present invention includes a vertically disposed strip of high density polyethylene (HDPE) mounted immediately behind the cutter bar (40). The rock guard (50) extends up from the flexible grain table (28) about three inches and it is mounted thereto by the lower section of L-shaped brackets (60) and bolts (46). The upper section of the brackets (60) are attached to the rock guard (50) by bolts (62). It should be noted that shorter brackets (60) are used when it is mounted over a clamp (44) to allow for the thickness of the clamp (44) as is shown in FIG. 4.

The rock guard (50) extends completely across the grain table (28) and includes a series of vertical gaps positioned to align with the flexible joints (34) of the grain table (28). In the embodiment illustrated in FIGS. 2–6, the gap extends completely through the rock guard (50) from the lower edge (51) to the upper edge (52) to form a number of sections approximately the same width as the overlapping sections (32). The vertical edges (53) of each of the rock guard sections are beveled so that adjacent rock guard sections overlap, and brackets (60) are attached near the vertical edges (53).

As illustrated in FIG. 3, the forward vertical face (54) of the rock guard (50) is disposed to contact rocks (100) and prevent them from advancing to the grain table (28) and beyond where structural damage can occur. The rear vertical face (55) also acts as a stop to prevent loose grain from falling forward off the grain table (28) and dropping back to the ground. The resilient fingers (24) of the rotating reel (22) are spaced to pass slightly above the upper edge (52) of the rock guard (50) so that the crop will easily be moved back onto the grain table (28) while rocks (100) are prevented from doing so.

Figure 7:
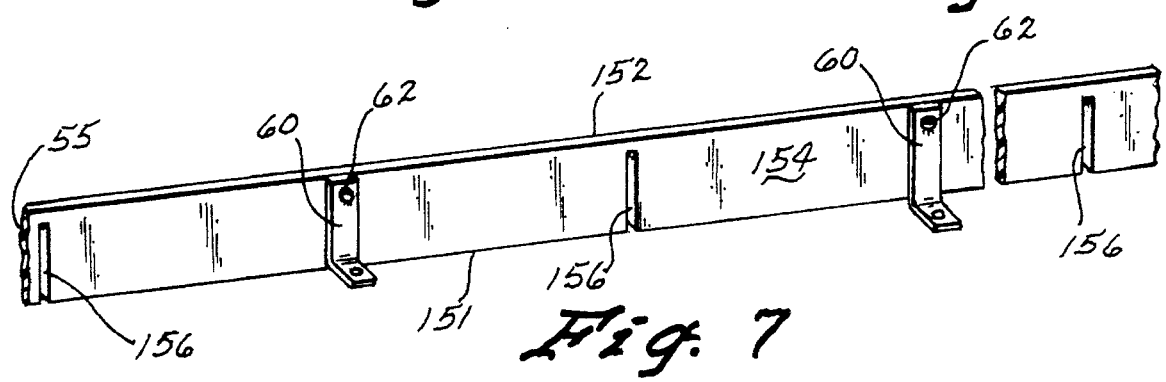
FIG. 7 is a perspective view of a second embodiment of the rock guard of the present invention that includes closed slots that extend up from the lower edge of the rock guard to allow flexing when mounted to the flexible grain table.

FIG. 7 shows an alternate embodiment of the rock guard (150) which is formed of a continuous strip of HDPE. Closed slots (156) extend up from the lower edge (151) and are formed at intervals that correspond to the spacing of the flexible joints (34) of the grain table (28). The upper section of the bracket (60) is attached by bolts (62) to the rock guard (150) midway between the slots (156) and the lower section of the bracket will be attached by the same bolts (46) that secure the cutter bar (40) to the grain table (28). If the material from which the strip is formed is not long enough to extend completely across the grain table (28), a beveled joint similar to that shown in FIGS. 2 and 4 may be used. Like the first embodiment of the rock guard (50), the rock guard (150) includes an upper edge (152) disposed to be spaced from the fingers (24) of the reel (22), and a forward vertical face (154) disposed to contact rocks (100) while the rear vertical face (155) acts to retain loose grain on the grain table (28).

In operation the rock guard (50 or 150) is mounted on the grain table (28) immediately behind the cutter bar (40) using L-shaped brackets (60). The upper section of each bracket is mounted to the rock guard (50 or 150) with bolts (62) and the lower section of each bracket is mounted to the grain table (28) using the same bolts (46) that are used to mount the cutter bar (40) to the grain table (28). The gaps between the sections at the rock guard (50), or the closed slots in the rock guard (150) are aligned with the flexible joints (34) so that the rock guard (50 or 150) will flex with the grain table (28).

The combine operator can easily see rocks (100) from the vantage point of the cab (18). The rocks (100) can be removed by hydraulically raising the header (16) so that the rock falls to the ground, or the operator may stop the combine (10), exit the cab (18), and remove the rocks (100).

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. In a crop harvesting combine header including a horizontally disposed cutter bar mounted at the leading edge of a grain table, and a rotating reel disposed above the cutter bar and having resilient fingers to contact the crop and move it back onto the grain table, the improvement comprising:

a vertically disposed guard attached to the grain table and extending upwardly therefrom, the guard including a lower edge, an upper edge, a rear vertical face, and a forward vertical face disposed behind the cutter bar to contact rocks and prevent them from moving back onto the grain table.

2. The combine header of claim 1 wherein the upper edge of the guard is disposed in spaced relationship from the resilient fingers of the reel when the resilient fingers move over the guard.

3. The combine header of claim 1 wherein the grain table includes flexing means for allowing the grain table to flex vertically, and wherein the guard includes flexing means for allowing the guard to flex with the grain table.

4. The combine header of claim 3 wherein the grain table flexing means includes a plurality of sections disposed to overlap at regular spaced intervals to form flexible joints, and wherein the guard flexing means includes vertical gaps formed in the guard at locations aligned with the flexible joints of the grain table.

5. The combine header of claim 4 wherein each vertical gap in the guard extends completely through from the lower edge to the upper edge to form a plurality of guard sections.

6. The combine header of claim 4 wherein each vertical gap in the guard extends up from the lower edge and terminates below the upper edge to form a closed slot.

7. The combine header of claim 5 wherein vertical edges formed by each gap are beveled to overlap.

8. The combine header of claim 4 wherein the cutter bar is mounted on the grain table by cutter bar fasteners, and the guard is mounted on the grain table with brackets and selected ones of the cutter bar fasteners.

9. The combine header of claim 8 wherein each vertical gap in the guard extends completely through from the lower edge to the upper edge to form a plurality of guard sections having beveled vertical edges, and wherein each guard section is mounted to the grain table with brackets positioned adjacent the vertical edges.

10. The combine header of claim 8 wherein each vertical gap in the guard extends up from the lower edge and terminates below the upper edge to form a closed slot, and wherein the guard is mounted to the grain table with brackets positioned between the closed slots.

11. The combine header of claim 2 wherein the grain table includes flexing means for allowing the grain table to flex vertically, and wherein the guard includes flexing means for allowing the guard to flex with the grain table.

12. The combine header of claim 11 wherein the grain table flexing means includes a plurality of sections disposed to overlap at regular spaced intervals to form flexible joints, and wherein the guard flexing means includes vertical gaps formed in the guard at locations aligned with the flexible joints of the grain table.

13. The combine header of claim 12 wherein the grain table flexing means includes a plurality of sections disposed to overlap at regular spaced intervals to form flexible joints, and wherein the guard flexing means includes vertical gaps formed in the guard at locations above the flexible joints of the grain table.

14. The combine header of claim 12 wherein each vertical gap in the guard extends up from the lower edge and terminate below the upper edge to form a closed slot.

15. The combine header of claim 13 wherein vertical edges formed by each gap are beveled to overlap.

16. The combine header of claim 12 wherein the cutter bar is mounted on the grain table by cutter bar fasteners, and the guard is mounted on the grain table with brackets and selected ones of the cutter bar fasteners.

17. The combine header of claim 16 wherein each vertical gap in the guard extends completely through from the lower edge to the upper edge to form a plurality of guard sections having beveled vertical edges, and wherein each guard section is mounted to the grain table with brackets positioned adjacent the vertical edges.

18. The combine header of claim 16 wherein each vertical gap in the guard extends up from the lower edge and terminates below the upper edge to form a closed slot, and wherein the guard is mounted to the grain table with brackets positioned between the closed slots.

* * * * *